(12) United States Patent
Shim et al.

(10) Patent No.: US 9,762,111 B2
(45) Date of Patent: Sep. 12, 2017

(54) LINEAR VIBRATION GENERATION DEVICE

(71) Applicant: JAHWA electronics Co., Ltd., Chungcheongbuk-do (KR)

(72) Inventors: Soon Koo Shim, Chungcheongbuk-do (KR); Young Bin Chong, Chungcheongbuk-do (KR); Nam Jin Choi, Chungcheongbuk-do (KR); Min Goo Lee, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 15/420,334

(22) Filed: Jan. 31, 2017

(65) Prior Publication Data

US 2017/0141666 A1    May 18, 2017

Related U.S. Application Data

(60) Division of application No. 15/049,569, filed on Feb. 22, 2016, which is a continuation of application No. PCT/KR2014/010576, filed on Nov. 5, 2014.

(30) Foreign Application Priority Data

Nov. 7, 2013    (KR) ........................ 10-2013-0134890

(51) Int. Cl.
*H02K 33/00* (2006.01)
*H02K 33/16* (2006.01)
*H02K 5/02* (2006.01)

(52) U.S. Cl.
CPC ............... *H02K 33/16* (2013.01); *H02K 5/02* (2013.01)

(58) Field of Classification Search
CPC ............................... H02K 33/00; H02K 33/16
See application file for complete search history.

(56) References Cited

U.S. PATENT DOCUMENTS

| 2011/0278961 A1* | 11/2011 | Jeong | ............... H02K 33/16 310/25 |
| 2012/0133220 A1 | 5/2012 | Hong | |
| 2012/0319506 A1* | 12/2012 | Shim | ............... H02K 33/16 310/25 |

FOREIGN PATENT DOCUMENTS

| KR | 10-2008-0074329 A | 8/2008 |
| KR | 10-2010-0021987 A | 2/2010 |
| KR | 10-1142284 B1 | 5/2012 |
| KR | 10-2012-0059132 A | 6/2012 |
| KR | 10-1180486 B1 | 9/2012 |
| KR | 10-2012-0139524 A | 12/2012 |
| KR | 10-1254211 B1 | 4/2013 |
| KR | 10-2013-0070100 A | 6/2013 |

* cited by examiner

*Primary Examiner* — Dang Le

(74) *Attorney, Agent, or Firm* — Maier & Maier, PLLC

(57) ABSTRACT

Disclosed is a linear vibration generating device including: a stator including a bracket on which a coil is seated, and a case made of a magnetic material which is engaged to the bracket to form an inner space; a vibrator including a permanent magnet for generating a vibration force in cooperation with the coil, and a weight enclosing a circumference of the permanent magnet; a resilient member which is positioned between the vibrator and the stator to resiliently support vertical oscillation of the vibrator; and a plate which is positioned between the resilient member and the vibrator

5 Claims, 11 Drawing Sheets

LINEAR VIBRATION GENERATION DEVICE

CROSS-REFERENCE TO RELATED APPLICATIONS

This application is a Divisional Application of U.S. Ser. No. 15/049,569 filed on Feb. 22, 2016, which is a continuation of International Application No. PCT/KR2014/010576 filed on Nov. 5, 2014, which claims priority to Korean Application No. 10-2013-0134890 filed on Nov. 7, 2013, which applications are incorporated herein by reference.

TECHNICAL FIELD

The present invention relates to a linear vibration generating device, and more particularly, to a linear vibration generating device capable of generating a vibration by use of repeatedly vertically linear movement of a weight which is caused by interaction between an electric field generated by a coil and a magnetic field generated by a permanent magnet.

BACKGROUND ART

Due to the popular propagation of cellular phones, noise pollution caused by incoming call ringtone leads to introduction of a new type of silence incoming call, such as vibration. Such a new type of silence incoming call is realized by a technology of notifying a user of the incoming call or reception of a text message by applying an electromagnetic force to a weight to vibrate the weight.

The incoming call notification of the vibration type according to the related art generally employs a technology of eccentrically mounting a rotating vibrator to a motor. The above technology has drawbacks in that it does not guarantee an extended lifespan, the speed of response is not fast, and it is limited to various vibration modes. Accordingly, with the trend in rapid popularization of a smartphone of a touch type, referred to as a touch phone, it is limited to meet the demand of users.

In order to solve the above problems, a linear vibration generating device has been proposed to generate vibration by linearly oscillating a weight. The proposed linear vibration generating device is configured to generate the desired vibration by linearly oscillating the weight with interaction between an electric field caused by a coil, to which a current is applied, and a magnetic field caused by a permanent magnet enclosing the coil.

Korea Patent No. 1254211 (Published on Apr. 18, 2013, entitled "Linear Actuator", hereinafter referred to as the related patent document) discloses a technology of generating the vibration by linearly oscillating the weight. The technology disclosed in the related patent document is to maintain stable operation characteristics by increasing magnetic efficiency and to miniaturize the device.

The linear actuator disclosed in the related patent document will now be described in detail with reference to FIG. 1.

Referring to FIG. 1, the linear actuator includes a vibrator 115, a stator 110, and cases 135 and 102 for protecting the vibrator and the stator. The vibrator 115 has a magnet 111 for producing the magnetic field and a weight 112 enclosing the magnet. The stator 110 has a yoke 107 installed at a center of the lower case 102 and a coil 106 disposed around the yoke 107.

A PCB 105 is disposed at a center of a top surface of the lower case 102 so as to be electrically connected to the coil 106 and thus transmit an electric signal to the coil from the exterior. An elastic member 120 is interposed between the upper case 135 and the weight 112, or the lower case 102 and the weight 112 to elastically support the vibrator 115 and limit an amplitude of vibration within a desired value.

In order to increase a magnetic flux density with the magnetic shield, an upper plate 113 and a lower plate 114 are provided to top and bottom surfaces of the magnet 111 to in such a way of being brought into closely contact with each other to cover the upper and lower portions of the magnet 111, and dampers 140 and 142 are attached to one surface of the upper case 135 and one surface of the lower case 102 which face the plates 113 and 114, respectively.

The dampers 140 and 142 serve as a shock absorbing member capable of preventing the top and bottom surfaces of the vibrator 115 from coming into contact with the cases 135 and 102 when the vibrator 115 oscillates in the vertical direction. The dampers serving as the shock absorbing member can reduce noise generated when the vibrator 115 comes into contact with the cases 135 and 102.

According to the above related art, when the electric signal (AC power) is input to the coil 106 through the PCB 105, the vibrator 115 vertically oscillates relative to the stator 110 by use of the interaction between the electric field generated by the stator 110 and the magnetic field generated by the magnet forming the vibrator 115.

However, the configuration disclosed in the related patent document has the following problems.

First, since the dampers are provided at inner upper and lower positions of the case, and the plates 113 and 114 having a desired thickness are provided on the top and bottom surfaces of the vibrator, it is not easy to secure a sufficient stroke distance, that is, an amplitude, so that the vibrator vibrates in the limited space of the case. As a result, the height of the case should be increased, which does not meet the miniaturization of the device. Also, the above-described related art has another problems of producing noise due to collision between the vibrator and the case, and being limited to thinning of the actuator due to the magnetic shield or the like.

Finally, in the process of generating vibrating the vibrator, since the vibrator undergoes lateral wobble, that is, pitching motion, as well as the vertical oscillation, an outer corner of the vibrator comes into directly contact with the case, which causes the noise to produce, thereby deteriorating the quality and reliability of the product.

SUMMARY

Accordingly, the problem to be solved by the present invention is to provide a linear vibration generating device capable of securing a space which can obtain a sufficient stroke distance, that is, a sufficient amplitude, to cause a vibrator to oscillate without increasing a height of a case, thereby miniaturizing the device.

Another problem to be solved by the present invention is to provide a linear vibration generating device capable of preventing mechanical contact of components due to a pitching motion of a vibrator, and thus effectively decreasing a noise to be caused by the contact.

To accomplish the above-mentioned object, according to one aspect of the present invention, there is provided a linear vibration generating device including: a stator including a bracket on which a coil is seated, and a case made of a magnetic material which is engaged to the bracket to form an inner space; a vibrator including a permanent magnet for generating a vibration force in cooperation with the coil, and a weight enclosing a circumference of the permanent magnet; a resilient member which is positioned between the vibrator and the stator to resiliently support vertical oscillation of the vibrator; and a plate which is positioned between the resilient member and the vibrator.

The linear vibration generating device may further include a damping member which is provided on at least one surface of an exposed surface of the permanent magnet which is opposite to the plate, and one surface of the stator facing the exposed surface of the permanent magnet.

The damping member provided on the exposed surface of the permanent magnet may include a magnetic fluid.

The plate covers a portion of the weight, and an inner peripheral surface of the plate further may protrude inwardly from an inner peripheral surface of the permanent magnet, or be positioned on the same line as the inner peripheral surface of the permanent magnet.

Preferably, an inner peripheral surface of an inner fixing end of the resilient member which is brought into contact with the plate is arranged on the same line as an inner peripheral surface of the plate.

In one embodiment of the present invention, the stator may further include a yoke housed in an inner diameter portion of the coil.

The yoke may be made of a magnetic material, and be formed in a cylindrical shape having a T- or cross-shaped cross section.

In one embodiment of the present invention, the linear vibration generating device may further include a magnetic fluid which is applied on an outer surface of the plate.

One end (inner fixing end) of the resilient member may be fixed to the plate, and the other end (outer fixing end) may be fixed to one side of the case or a top surface of the bracket facing the plate.

In another embodiment of the present invention, the linear vibration generating device may further include a pitching impact protector which is provided on the weight facing the weight which is opposite to the plate.

In this instance, an edge or a corner of a top surface of the weight may be provided with a recessed portion to correspond to the pitching impact protector.

According to embodiments of the present invention, even though the plate is installed to any one of the top and bottom surfaces of the vibrator to which the resilient member is attached, it is possible to sufficiently concentrate the magnetic flux of the permanent magnet, thereby realizing the linear vibration generating device having the effective vibration performance. Also, it is possible to reduce the costs and the size by eliminating the plate.

Specifically, as compared to the configuration of the related art in which the plates are provided on both the upper and lower portions of the permanent magnet, the plate can be provided on only any one of the upper and lower portions by applying the case made of the magnetic material. Accordingly, the linear vibration generating device can secure the space which can obtain the sufficient stroke distance, that is, the sufficient amplitude, to cause a vibrator to oscillate without increasing the height of the case, thereby improving the performance and miniaturizing the device. In addition, the present invention includes the damping member made of the magnetic fluid which is directly applied on the surface of the permanent magnet, it is possible to minimize dislocation of the damping member which is positioned at a point to which impact is heavily applied.

The plate inner peripheral surface of the plate further protrudes inwardly from the inner peripheral surface of the permanent magnet or is positioned on the same line as the inner peripheral surface of the permanent magnet. In addition, the inner surface of the plate is arranged on the same line as the inner peripheral surface of the one fixing end of the resilient member. Therefore, it is possible to maximize the length of the driving portion (referred to as a spring foot) of the resilient member which connects the outer fixing end and the inner fixing end of the resilient member.

Specifically, even though the driving portion (spring foot) of the spring does not have the complicated structure, unlike that of the related art, the resilient member can have the desired restoring force. After all, it is possible to simplify the configuration of the resilient member, thereby having the competitive price due to the improved mass production and the reduced manufacturing costs.

Also, by the damper provided on one surface of the case facing the outer corner of the weight, it is possible to prevent mechanical contact of components (weight and stator) due to a pitching motion of the vibrator and reduce the noise caused by the mechanical contact. Accordingly, the present invention can realize the linear vibration generating device of high reliability and high quality which can show stable vibration characteristics.

DETAILED DESCRIPTION

Hereinafter, preferred embodiments of the present invention will be described in detail with reference to the accompanying drawings.

Figure 1:
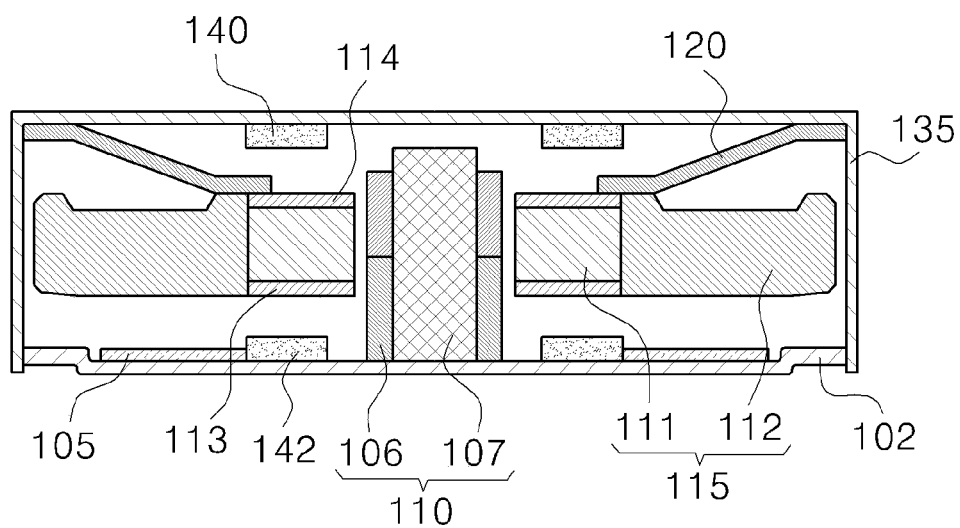
FIG. 1 is a cross-sectional view of a linear vibration generating device according to the related art.
Figure 2:
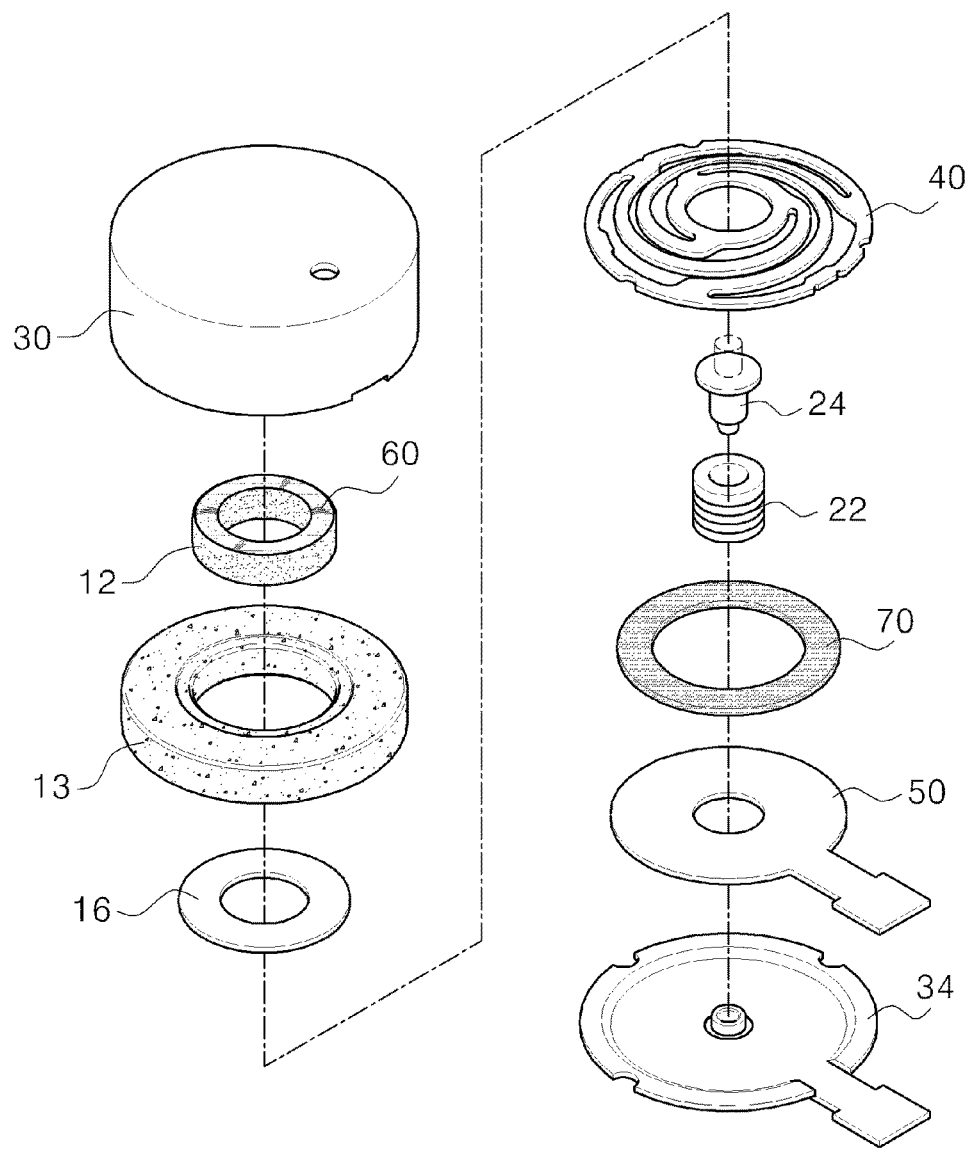
FIG. 2 is an exploded perspective view of a linear vibration generating device according to a first embodiment of the present invention.
Figure 3:
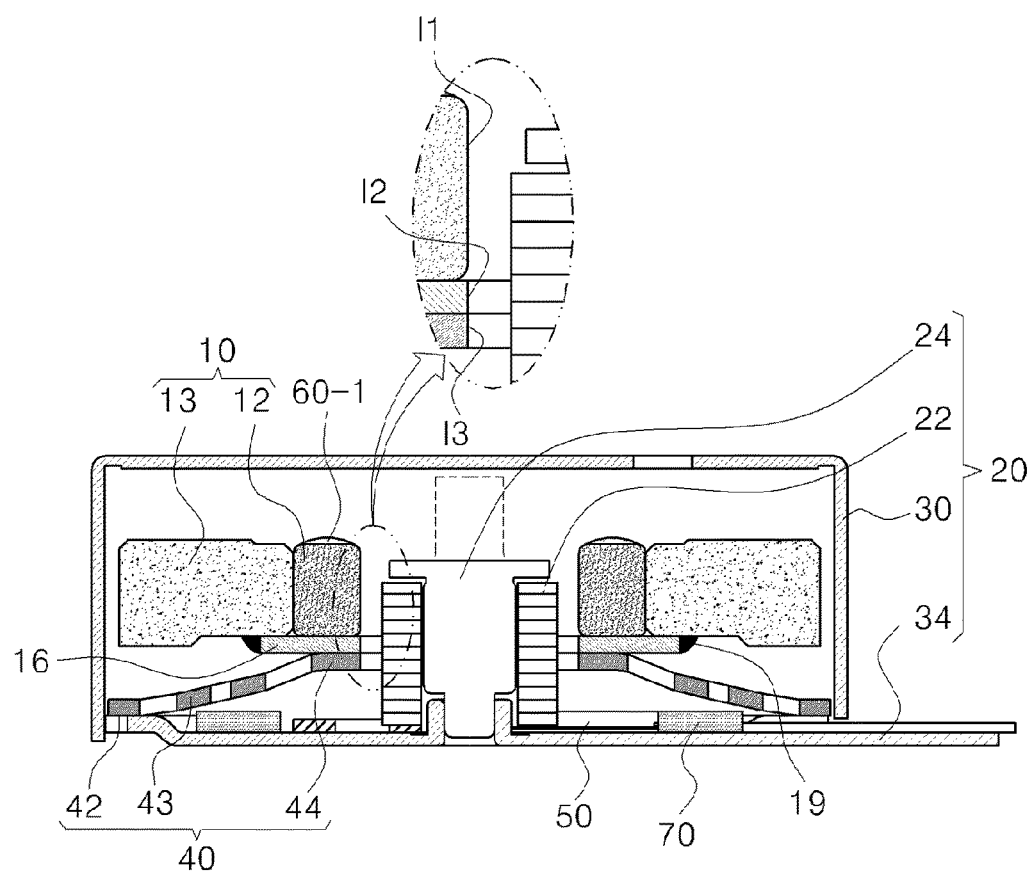
FIG. 3 is a cross-sectional view illustrating an assembled state of the linear vibration generating device in FIG. 2.

FIG. 2 is an exploded perspective view of a linear vibration generating device according to a first embodiment of the present invention. FIG. 3 is a cross-sectional view illustrating an assembled state of the linear vibration generating device in FIG. 2. The whole configuration of the linear vibration generating device according to the present invention will now be described with the drawings.

Referring to FIGS. 2 and 3, the linear vibration generating device according to the present invention mainly includes a vibrator 10 and a stator 20. A resilient member 40 is interposed between the vibrator 10 and the stator 20 to resiliently support vertical oscillation of the vibrator 10, and a PCB 50 for supplying an AC power to generate the oscillation is provided on a planar bracket 34 constituting the stator 20.

The vibrator 10 has a permanent magnet 12 for forming a magnetic field and a weight 13 engaged to the permanent magnet 12 in such a manner of enclosing the permanent magnet 12 to apply a load to the permanent magnet. The stator 20 has the bracket 34, a cylindrical coil 22 seated on a top surface of the bracket 34 and placed at a center of the permanent magnet 12, a yoke 24 housed in an inner diameter portion of the coil 22, and a case 30.

The coil 22 is electrically connected to the PCB 50 placed on the bracket 34, and receives the electric signal to vibrate the vibrator 10 relative to the stator 20. The vibrator 10 vertically oscillates relative to the stator 20 by an attractive force and a repulsive force between the electric field generated by the coil 22 and the magnetic field generated by the permanent magnet 12 in response to the received electric signal.

An amplitude of the vibrator 10 can be limited within a proper range by a coefficient of elasticity of the resilient member 40 and the attractive force acting between the permanent magnet 12 and the Yoke 24. The permanent magnet 12 has an inner diameter to such an extent not as to interfere the yoke 24, and may be formed in an annular shape having opposite polarities in a vertical direction, that is, a donut shape.

The yoke 24 may be formed in a simple cylindrical shape, or may be formed in a cylindrical shape having a T- or cross-shaped cross section. In the case of the latter, the yoke has a planar shield to cover an upper portion of the coil 22. In particular, the yoke 24 is made of a magnetic material to concentrate the magnetic flux generated from the permanent magnet 12 on the coil 22 wound around the yoke, and to produce the attractive force with the permanent magnet, thereby limiting the amplitude of the vibrator 10. The yoke 24 which is formed in a cylindrical shape having a T cross section is not contact with the case 30. Namely the yoke 24 is spaced with upper portion of case 30.

In view of the effect of concentrating the magnetic flux through the magnetic shield or weight lightening, the yoke is preferably formed to have the T-shaped cross section. Also, in view of the easy of assembly when the yoke is held in the process of transferring the yoke of a very small size to an object to be assembled, the yoke is preferably formed to have the cross-shaped cross section.

The linear vibration generating dev ice further includes a plate 16 to cover a portion of the vibrator 10, as well as the bottom surface of the permanent magnet 12. The plate 16 may have a planar body with a hole formed in a center thereof. The plate 16 serves as the magnetic shield in order to concentrate the magnetic flux generated from the permanent magnet 12 on the coil 22.

The plate 16 is fixed to one side of the vibrator 10 facing the resilient member 40, and thus vibrates together with the permanent magnet 12 and the weight 13 when the vibrator 10 vertically oscillates. The plate 16 covers a portion of the weight 13, and an inner peripheral surface 12 of the plate may further protrude inwardly from an inner peripheral surface 11 of the permanent magnet 12 or be positioned on the same line as the inner peripheral surface 11 of the permanent magnet 12 in a vertical direction.

The resilient member 40 resiliently supports the vibrator 10 consisting of the permanent magnet 12 and the weight 13 to provide the vibrator with a resilient force, which returns the vibrator to its original position relative to the stator 20, and to limit the amplitude of the vibrator 10, which prevents the vibrator 10 consisting of the permanent magnet 12 and the weight 13 from colliding against the case 30 constituting the stator 20.

One end of the resilient member 40 is welded to the bottom surface of the plate 16, and an opposite end is welded to an edge of the top surface of the bracket 34. Of course, both ends of the resilient member may be welded to the top surface of the plate and one surface of the upper case facing the top surface in the configuration of which the plate is placed on the top surface of the vibrator (see the second embodiment described later), respectively.

If an inner peripheral surface 13 of an inner fixing end 44 of the resilient member 40 which is brought into contact with the plate 16 is arranged on the same line as an inner peripheral surface 12 of the plate 16, it is possible to maximize the length of a driving portion (referred to as a spring foot 43) of the resilient member which connects an outer fixing end 42 and the inner fixing end 44 of the resilient member 40 in the limited space, thereby simplifying a pattern of the driving portion 43.

The linear vibration generating device with no plate 16 can be easily thinned, but there is a problem in that the driving portion 43 of the resilient member 40 is not positioned to be brought into directly contact with the lower portion of the permanent magnet in the innermost side of the vibrator 10 relative to the inner diameter of the vibrator.

That is, the control of the amplitude (oscillation frequency or resonance frequency) of the resilient member 40 is advantageous as the resilient member is positioned in the innermost side of the vibrator relative to the inner diameter of the vibrator. However, if the resilient member is directly welded to the permanent magnet, the permanent magnet is demagnetized to change the vibration force. According to the present invention, since the plate 16 is positioned only between the resilient member 40 and the permanent magnet 12, the linear vibration generating device can be provided of which the vibration characteristic is not deteriorated while reducing the thickness thereof.

The case 30 constituting the stator 20 is engaged to the bracket 34 to form an inner space in which the vibrator 10 and the resilient member 40 are housed. In the embodiment of the present invention, as long as a material of the case 30 is magnetic (for example, metal material), it is not limited to any specific material. The case may be formed to have a width and a height such that the vibrator, the resilient member, and the coil can be housed therein.

The PCB 50 inputs the electric signal to the coil 22 from the exterior, and, to this end, is electrically connected to a coil wire led from the coil 22. The PCB 50 may be provided as a ring shape, as illustrated in FIG. 2, and be fixed by the yoke 24 housed in the inner diameter portion of the coil 22 which is brought into directly contact with the bracket 34 or is engaged to an engaging hole formed in the center of the bracket 34.

In order to prevent the direct contact between the vibrator and the case when the vibrator 10 vertically oscillates, according to the first embodiment, a damping member 60-1 is provided on the exposed surface of the permanent magnet 12 which is positioned opposite to the attached side of the plate 16. In this embodiment, the damping member may be a magnetic fluid which is directly applied on the exposed surface of the magnet and is restrained from leaving from its location by the magnetic force. That is, since leaving of the damping member 60-1 is minimized by the direct influence of the permanent magnet, the reliability of the product is advantageously improved.

Figure 4:
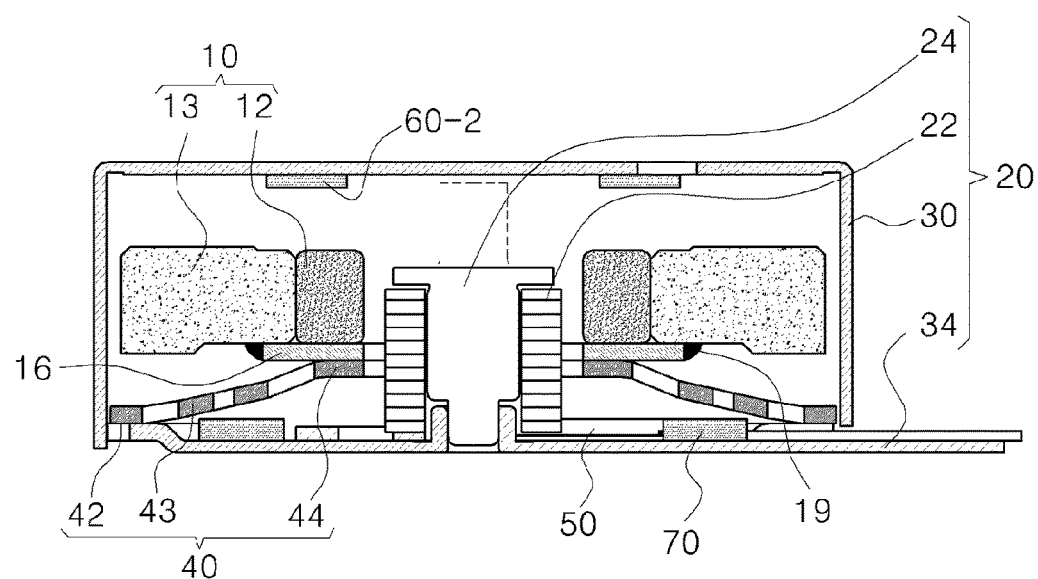
FIG. 4 is a cross-sectional view illustrating a modified embodiment of the first embodiment in FIG. 3.

As illustrated in FIG. 4 which shows a modified embodiment of the first embodiment in FIG. 3, a damping member 60-2 may be attached to one side of the case 30 which faces the exposed surface of the permanent magnet 12 which is opposite to the plate 16. In this instance, the damping member 60-2 may employ a damper made of rubber, silicon or foam rubber.

Figure 5:
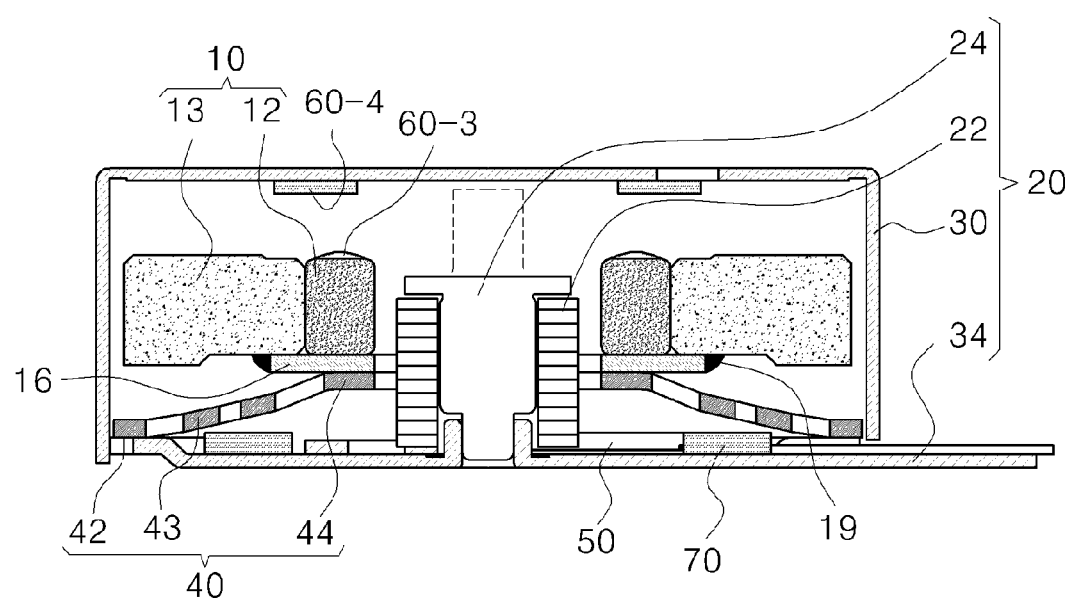
FIG. 5 is a cross-sectional view illustrating another modified embodiment of the first embodiment in FIG. 3.

As illustrated in FIG. 5 showing another modified embodiment, damping members 60-3 and 60-4 may be provided on both the exposed surface of the permanent magnet 12 which is opposite to the plate 16 and the side of the case 30 facing the exposed surface. In this instance, it is preferable that a magnetic fluid is employed as the damping member 60-3 of the exposed surface, and a damper made of a rubber or silicon material is employed as the damping member 60-4 of the side facing the exposed surface.

In the first embodiment illustrated in FIGS. 2 to 5, a reference numeral 19 denotes the magnetic fluid applied on the outer peripheral surface of the plate 16, which covers a portion of the lower portion of the vibrator 10, for the purpose of the magnetic shield, and 70 denotes a shock absorbing member which is disposed on the bracket 34 in the resilient member 40 to prevent the mechanical contact between the bracket 34 and the resilient member 40 resiliently deformed when the vibrator 10 vertically oscillates.

The shock absorbing member 70 may be made of a material capable of absorbing or alleviating the shock when the vibrator 10 comes into contact with the shock absorbing member, for example, rubber, silicon or foam rubber, but it is not limited to any special material as long as the material realizes the shock absorption with cushion. As illustrated in the drawing, the shock absorbing member may be provided in an annular shape.

Figure 6:
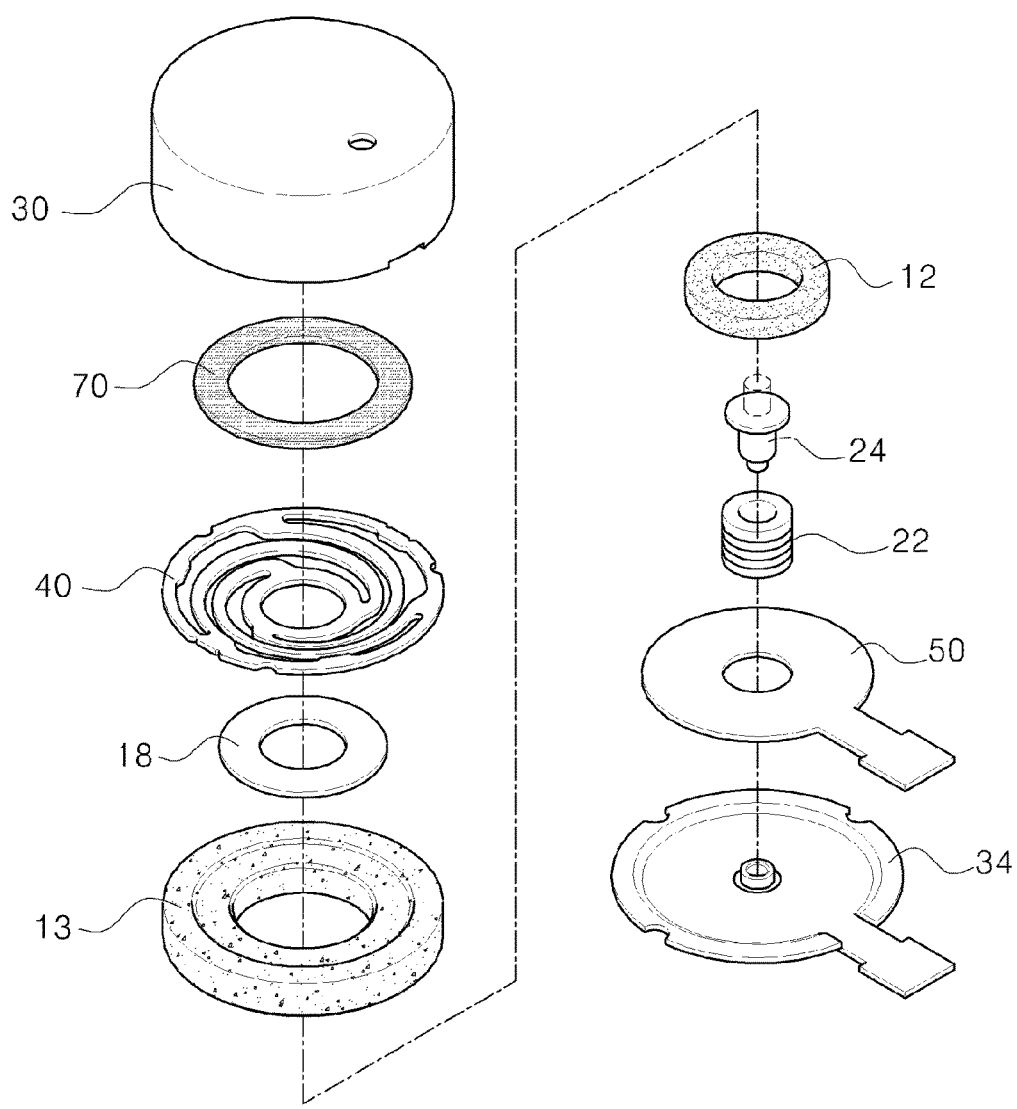
FIG. 6 is an exploded perspective view of a linear vibration generating device according to a second embodiment of the present invention.
Figure 7:
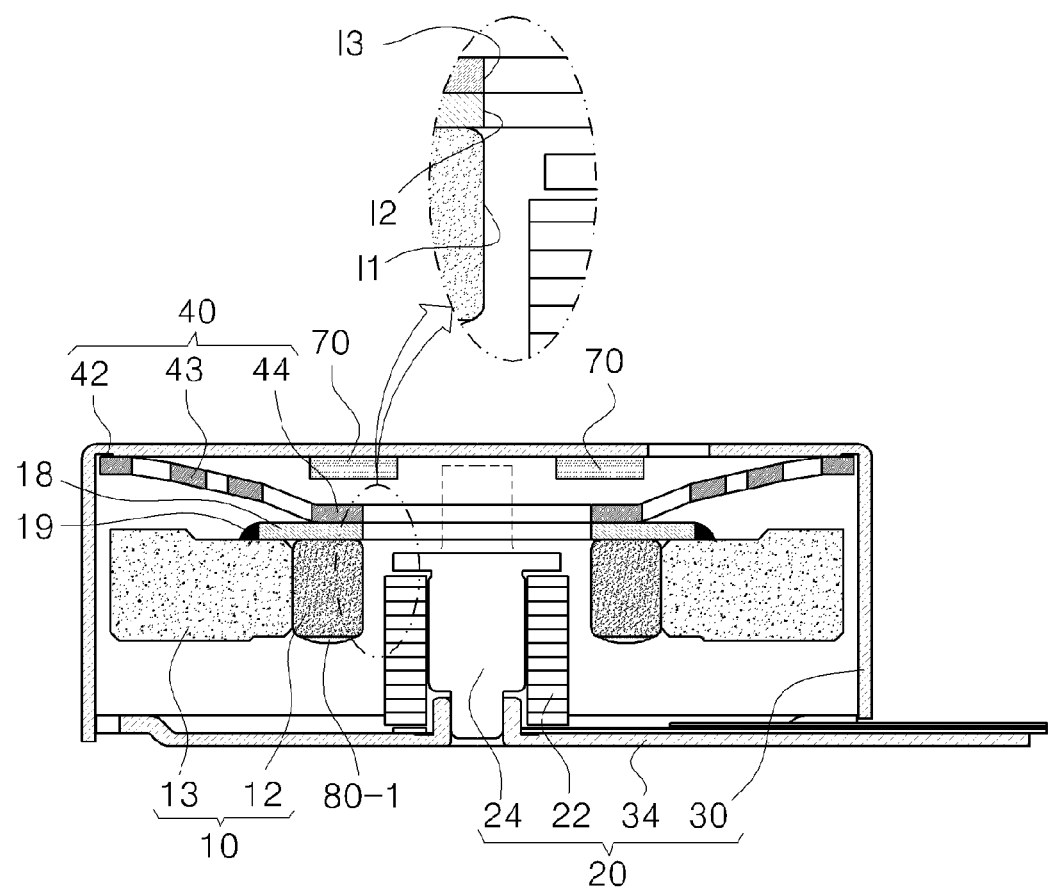
FIG. 7 is a cross-sectional view illustrating an assembled state of the linear vibration generating device in FIG. 6.

FIG. 6 is an exploded perspective view of a linear vibration generating device according to the second embodiment of the present invention. FIG. 7 is a cross-sectional view illustrating an assembled state of the linear vibration generating device in FIG. 6.

The linear vibration generating device according to the second embodiment in FIGS. 6 and 7 is similar to the linear vibration generating device according to the first embodiment, except that the plate 18 and the resilient member 40 are placed on the vibrator 10. Specifically, the plate 18 and the resilient member 40 are positioned on the vibrator 10, and the exposed surface of the permanent magnet 12 which is opposite to the plate 18 faces the bottom side.

Since the configuration of the second embodiment is substantially similar to that of the first embodiment, except that the vibrator 10 and the resilient member 40 are inverted in the case 30, the same components as those in the first embodiment are denoted by the same reference numerals, and the detailed description will be omitted herein. Therefore, only components different from those in the first embodiment will now be described in brief.

Referring to FIGS. 6 and 7, the linear vibration generating device according to the second embodiment includes a plate 18 which is configured to cover a portion of the vibrator 10, as well as the top surface of the permanent magnet 12. The resilient member 40 is interposed between the plate 18 and the stator 20, specifically, the case 30, to resiliently support the vertical oscillation of the vibrator 10.

The plate 18 is fixed to one surface of the vibrator 10 facing the resilient member 40, and thus vibrates together with the permanent magnet 12 and the weight 13 when the vibrator 10 vertically oscillates, similar to the first embodiment. The plate 18 covers a portion of the weight 13, and an inner peripheral surface 12 of the plate may further protrude inwardly from an inner peripheral surface 11 of the permanent magnet 12 or be positioned on the same line as the inner peripheral surface 11 of the permanent magnet 12 in a vertical direction.

One end of the resilient member 40 is fixed to the top surface of the plate 18, and an opposite end is fixed to one side of the case 30 facing the plate 18. Similar to the first embodiment, if an inner peripheral surface 13 of an inner fixing end 44 of the resilient member 40 which is brought into contact with the plate 18 is arranged on the same line as the inner peripheral surface 12 of the plate 18, it is possible to preferably maximize the length of a driving portion (referred to as a spring foot 43) of the resilient member.

A damping member 80-1 is provided on the exposed surface of the permanent magnet 12 which is positioned opposite to the attached side of the plate 18, so as to prevent the mechanical contact between the lower portion of the vibrator 10 and a base 34 when the vibrator 10 vertically oscillates. In the second embodiment, the damping member 80-1 may be a magnetic fluid which is provided in such a way a center to be brought into contact with the case is convex in a downward direction.

Figure 8:
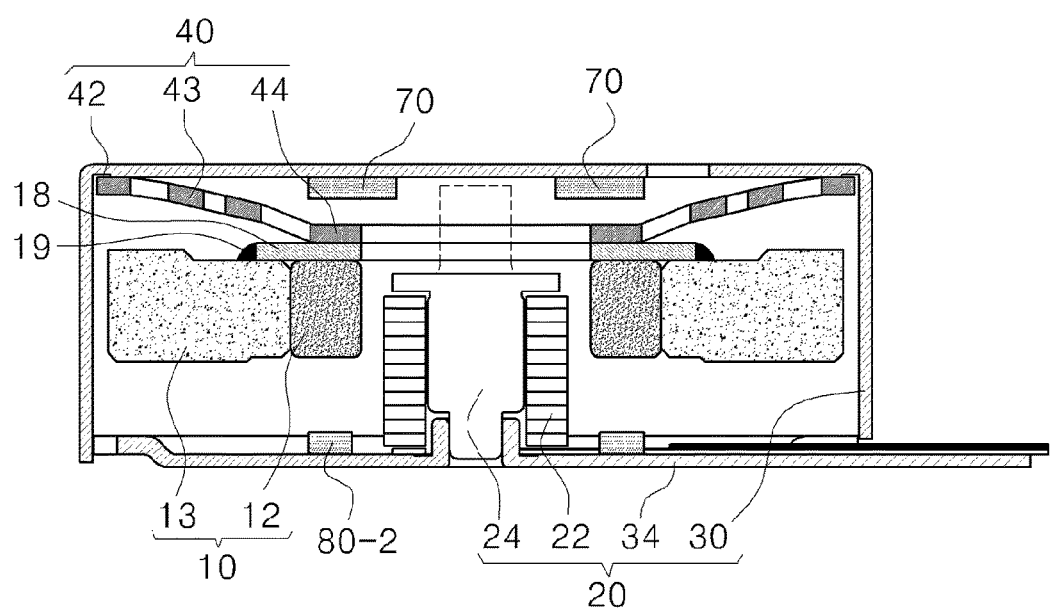
FIG. 8 is a cross-sectional view illustrating a modified embodiment of the second embodiment in FIG. 7.

According to a modified embodiment illustrated in FIG. 8, a damping member 80-2 may be a damper made of rubber, silicon or foam rubber which is provided on the case facing the exposed surface of the permanent magnet which is opposite to the plate 18, specifically, the top surface of the bracket 34. Otherwise, as illustrated in FIG. 9 showing another modified embodiment, damping members 80-3 and 80-4 may be provided on both the exposed surface of the permanent magnet 12 which is opposite to the plate 18 and the side of the case 30 facing the exposed surface.

Figure 9:
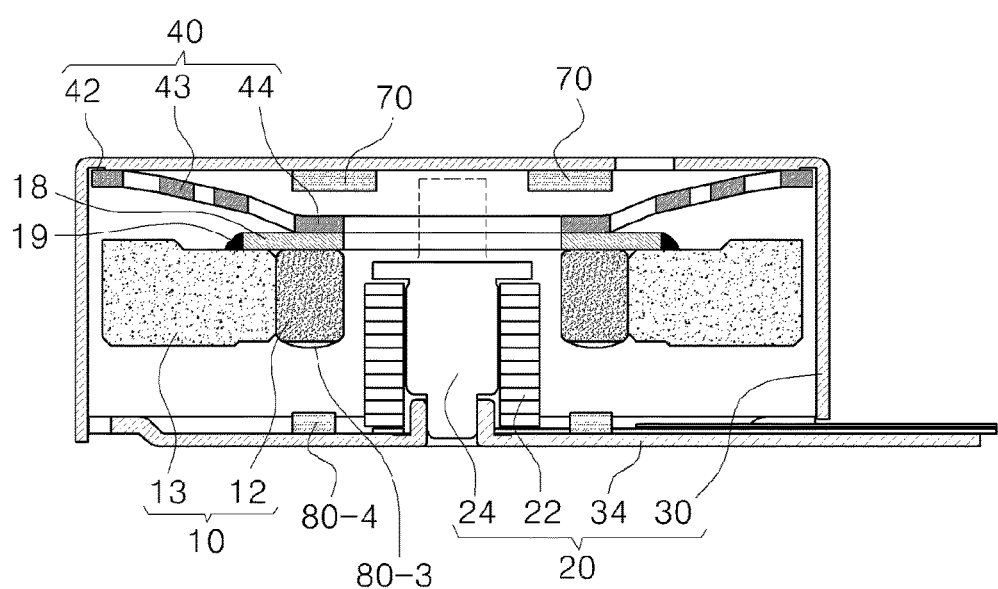
FIG. 9 is a cross-sectional view illustrating another modified embodiment of the second embodiment in FIG. 7.

In the above modified embodiment in FIG. 9 in which the damping members 80-3 and 80-4 are provided on both the exposed surface of the permanent magnet 12 and the side of the case 30, a magnetic fluid is employed as the damping member 80-3 provided on the exposed surface, and a damper made of a rubber or silicon material is employed as the damping member 80-4 of the side of the case 30 facing the exposed surface.

According to the first and second embodiments of the present invention, even though the plate is installed to any one of the top and bottom surfaces of the vibrator to which the resilient member is attached, it is possible to sufficiently concentrate the magnetic flux of the permanent magnet, thereby realizing the linear vibration generating device having the effective vibration performance. Also, it is possible to reduce the costs and the size by eliminating the plate.

Specifically, as compared to the configuration of the related art in which the plates are provided on both the upper and lower portions of the permanent magnet, the plate can be provided on only any one of the upper and lower portions by applying the case made of the magnetic material. Accordingly, the linear vibration generating device can secure the space which can obtain the sufficient stroke distance, that is, the sufficient amplitude, to cause a vibrator to oscillate without increasing the height of the case, thereby improving the performance and miniaturizing the device.

The plate inner peripheral surface of the plate further protrudes inwardly from the inner peripheral surface of the permanent magnet or is positioned on the same line as the inner peripheral surface of the permanent magnet. In addition, the inner surface of the plate is arranged on the same line as the inner peripheral surface of the one fixing end of the resilient member. Therefore, it is possible to maximize the length of the driving portion (referred to as spring foot) of the resilient member which connects the outer fixing end and the inner fixing end of the resilient member in the limited space, thereby simplifying the configuration of the driving portion and providing the sufficient resiliently restoring force.

Figure 10:
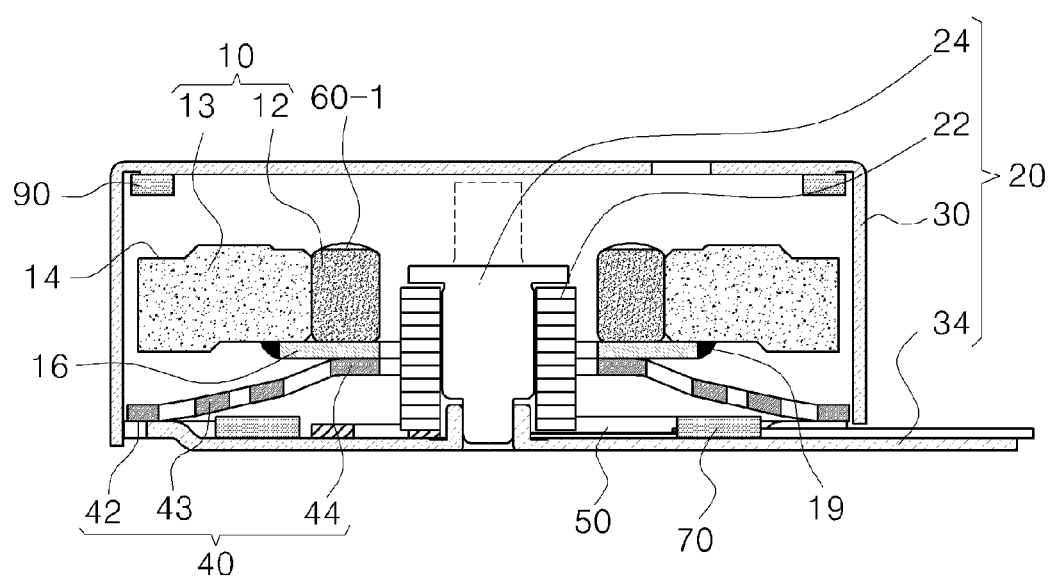
FIGS. 10 and 11 are cross-sectional views illustrating a linear vibration generating device according to third and fourth embodiments of the present invention.
Figure 11:
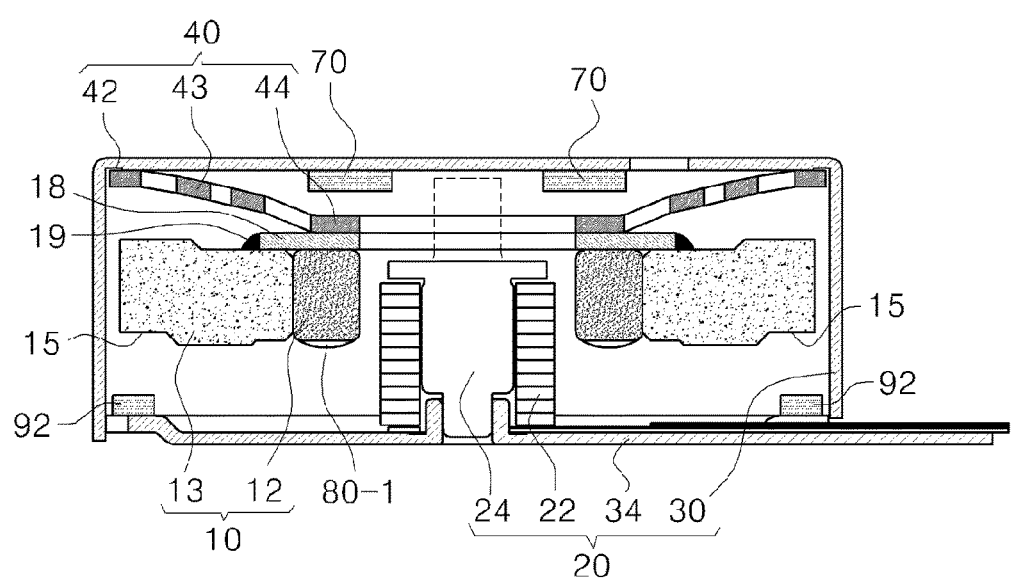

Meanwhile, FIGS. 10 and 11 are cross-sectional views illustrating a linear vibration generating device according to the third and fourth embodiments of the present invention.

As illustrated in FIGS. 10 and 11, the linear vibration generating devices according to the third and fourth embodiments of the present invention are substantially identical to those according to the first and second embodiments, except that pitching impact protectors 90 and 92 are provided on the stator 20 facing the weight 13 opposite to the plates 16 and 18, thereby preventing the vibrator 10 from being shocked due to pitching motion.

In the third and fourth embodiments, one edge or corner of the weight 13 is preferably further provided with recessed portions 14 and 15 corresponding to the pitching impact protectors 90 and 92. If the recessed portions 14 and 15 are provided, it is possible to solve a problem of losing the amplitude as much as the height of the pitching impact protectors 90 and 92 which are provided in the limited space.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The linear vibration generating device according to the present invention can be applied as an incoming call device for a cellular phone.

The invention claimed is:

1. A linear vibration generating device comprising:
    a stator including a bracket on which a coil is seated, and a case made of a magnetic material which is engaged to the bracket to form an inner space;
    a vibrator including a permanent magnet for generating a vibration force in cooperation with the coil, and a weight enclosing a circumference of the permanent magnet;
    a resilient member which is positioned between the vibrator and the stator to resiliently support vertical oscillation of the vibrator;
    a plate which is positioned between the resilient member and a bottom surface of the vibrator; and
    a damping member which is directly provided on central parts of an exposed surface of the permanent magnet which is opposite to the plate to prevent the permanent magnet from contacting an upper part of the case.

2. The linear vibration generating device according to claim 1, wherein the damping member directly provided on the exposed surface of the permanent magnet includes a magnetic fluid.

3. The linear vibration generating device according to claim 2, wherein the plate covers a portion of the weight, and an inner peripheral surface of the plate further is positioned on the same line as an inner peripheral surface of the permanent magnet.

4. The linear vibration generating device according to claim 2, further comprising a yoke housed in an inner diameter portion of the coil.

5. The linear vibration generating device according to claim 4, wherein the yoke is made of a magnetic material, and is formed in a cylindrical shape having a T-shaped cross section and is not contact with the case.

* * * * *